United States Patent [19]

Bishop

[11] Patent Number: 5,292,214
[45] Date of Patent: Mar. 8, 1994

[54] SLOTTING MACHINES

[75] Inventor: Arthur E. Bishop, Sydney, Australia

[73] Assignee: A. E. Bishop & Associates Pty Limited, North Ryde, Australia

[21] Appl. No.: 39,245

[22] PCT Filed: Apr. 10, 1992

[86] PCT No.: PCT/AU92/00159
§ 371 Date: Apr. 27, 1993
§ 102(e) Date: Apr. 27, 1993

[87] PCT Pub. No.: WO92/18276
PCT Pub. Date: Oct. 29, 1992

[30] Foreign Application Priority Data

Apr. 12, 1991 [AU] Australia .................... PK5592

[51] Int. Cl.⁵ .............................................. B23D 5/00
[52] U.S. Cl. ...................................... 409/307; 409/334
[58] Field of Search ............... 409/307, 305, 304, 293, 409/299, 326, 334; 74/568 R

[56] References Cited

U.S. PATENT DOCUMENTS 2,918,849  12/1959  Campbell et al. ..................... 409/7
4,154,145  5/1979   Bishop ................................ 409/307

FOREIGN PATENT DOCUMENTS 454207    3/1969   Australia .
511581    6/1978   Australia .
862822    7/1978   Belgium .
51-147095 12/1976  Japan .

Primary Examiner—William Briggs
Attorney, Agent, or Firm—Nikaido, Marmelstein, Murray & Oram

[57] ABSTRACT

Apparatus for forming an array of elongate slots in the bore of a valve sleeve (1) where the slots are cut in the bore by an arcuately movable cutting tool (5) mounted on the apparatus and the movement of the cutting tool (5) to form the length and depth of each slot is under the control of a desmodromic cam (12, 13) and a variable offset between the pivotal axis (8) of the cutting tool (95) and the pivotal axis (10) of the followers (15, 16) contacting the cam (12, 13).

24 Claims, 7 Drawing Sheets

SLOTTING MACHINES

This invention relates to an apparatus for manufacturing a plurality of parallel, longitudinally extending slots in the bore of a component. One example of such a component is the sleeve element of an automotive rotary power steering valve in which the slots are usually blind-ended and form a series of hydraulic ports circumferentially spaced within the sleeve bore, and which operate, in conjunction with similar circumferentially spaced ports in a co-acting cylindrical input-shaft element housed within the sleeve, upon slight relative rotation between these components. The present invention will be in particular reference to such sleeves even though it will be understood that it has wider application in the manufacture of parallel, longitudinally extending internal slots in the bore of components generally.

The prior art which is most closely related to that of the present invention is disclosed in Bishop U.S. Pat. No. 4,154,145 and Australian Provisional Patent Application PK3520 (Bishop). These so called "slotting machines" machine the slots in the bore of power steering valve sleeves. The design of these machines calls for each of the slots to be scooped out of the bore of a turned blank by a finger-like cutting tool mounted in a cutting spindle which angularly reciprocates about an axis in a series of progressively deeper cutting and return strokes so forming a closed chamber, or hydraulic port, which is arcuate in longitudinal section. The sleeve is held in a work holding collet, in turn mounted in a work holding spindle, having a rotational axis perpendicular to and offset with respect to the cutting spindle axis. By accurately indexing the work holding spindle upon completion of each slot, the required number of slots are precisely machined in the sleeve, usually 4, 6 or 8 slots for most automotive applications.

Slotting machines are designed such that the path of the cutting tool return stroke lies completely inside the circumference of the sleeve bore. This is highly desirable from a metal cutting viewpoint since it avoids "scuffing" the sides of the cutting tool tip, and hence promotes maximum tool life. This relieving action of the cutting tool during its return stroke, combined with the earlier referred to progressive infeed of the cutting tool during the cutting of each slot, is achieved by a "flying" bell crank mechanism combined with a spindle carrier arrangement.

The bell crank moves in space under the action of two cams. The first cam is arranged to rotate at high speed synchronously with the angular reciprocation of the cutting spindle and hence controls the relieving action of the cutting tool. This synchronisation is achieved by driving the cutting spindle via a connecting rod extending from a crank arranged on the shaft supporting this relieving cam. The second cam rotates at relatively low speed and controls the cutting tool infeed. The bell crank geometrically adds the inputs from these two cams and imparts its output via a lever integral with an oscillating spindle carrier. The cutting spindle is eccentrically housed within this spindle carrier, hence the output from the bell crank applied to the lever of the spindle carrier rotates the spindle carrier through a small angle and varies the aforementioned offset distance between the cutting spindle and work holding spindle axes. This mechanism provides progressive infeed of the cutting tool during the cutting of each sleeve slot together with a cyclic relieving of the cutting tool during each return stroke.

The two cam followers on the bell crank are held in contact with their respective cams by a spring which applies a turning moment to the spindle carrier so as to maintain contact between the cams and their respective followers at all times, otherwise the motion of the bell crank and the kinematics of the entire mechanism would be indeterminate.

Although elegant kinematically, use of a bell crank mechanism to combine cutting tool infeed and relieving actions has placed a major operational limitation on such slotting machines. In order to withstand the large inertial forces imposed by the necessary acceleration profile of the relieving cam (typically up to 30 g), the bell crank and appropriate cam followers must be robust in construction. This in turn results in the generation of large cyclic inertial forces which are impossible to fully dynamically balance, due to the complex spatial motion of the bell crank. The use of a spring to maintain contact between the relieving cam and its appropriate follower during radially inward and outward motion of this follower effectively doubles the contact load between these elements at the point of maximum radially outward acceleration of the follower. In practice a large torsion bar is used to apply a torsional moment to the spindle carrier. The torsion bar is stressed to near its endurance limit in actual production slotting machines and, even then, its required length means that it protrudes from the rear of these machines taking up valuable factory floor space. All these factors have ultimately increased the cost of slotting machines and limited their maximum operating speed to about 900-1000 reciprocations per minute.

It will be appreciated that the paths of the cutting tool during cutting and return strokes is not only determined by the summed action of the two cams described, but is also modified because the geometry of the earlier referred to crank and connecting rod drive to the cutting spindle changes with the varying distance between the axes of this cutting spindle and the relieving cam.

It has been the practice in such prior art slotting machines to modify the cutting tool path so as to reduce the angular acceleration of the spindle carrier at the point of reversal of the direction of the cutting spindle, that is towards the end of each cutting stroke and at the commencement of each return stroke and vice versa, by "looping" the cutting tool path well inside the circumference of the bore of the sleeve. This looped cutting tool path naturally somewhat restricts the clearance between the back of the cutting tool and the sleeve bore during each return stroke. For most sleeve designs to date however this restriction has been tolerable. However, in the case of a recent sleeve design described in Australian Provisional Patent Application PK3630, some sleeve slots extend to at least one axial extremity of the sleeve bore enabling a more efficient oil return passage within the power steering valve. This necessitates a deeper penetration of the cutting tool within the bore of the sleeve during slotting and thus only a minimum degree of "looping" is possible without the back of the cutting tool interfering with the bore of the sleeve during the cutting tool return stroke. This in turn requires much higher angular accelerations of the spindle carrier during relieving of the cutting tool.

The essence of the present invention is to separate the cutting tool relieving and infeeding mechanisms. This enables the cutting tool relieving to be carried out by a more efficient high speed desmodromic cam mechanism which is in no way constrained by the need to also provide cutting tool infeed. This desmodromic cam mechanism, together with the entire spindle carrier, may be housed in a cutting capsule which slides laterally during the cutting of each sleeve slot to progressively decrease the aforementioned offset distance between the perpendicular axes of the cutting spindle and the work holding spindle, thereby progressively infeeding the cutting tool into the sleeve bore.

The present invention consists of a machine for machining a plurality of parallel longitudinally extending slots in a bore of a component, comprising an indexable workholding spindle housing a workholding device for gripping said component, a cutting tool mounted on a cutting spindle, said cutting spindle being pivotally supported for angular reciprocation in a spindle carrier, the rotational axis of said cutting spindle being substantially perpendicular to and mutually offset from the rotational axis of said workholding spindle, characterised in that said spindle carrier is in turn pivotally supported on a rotational axis for angular oscillation within a cutting capsule, said rotational axis of said cutting spindle being parallel to and offset relative to the rotational axis of said spindle carrier, connecting means connecting a rotatable shaft member and said cutting spindle to effect angular reciprocation of said cutting spindle upon rotation of said shaft member, desmodromic cam means controlling angular oscillation of said spindle carrier upon rotation of said shaft member, wherein said axis of said cutting spindle is movable towards said axis of said workholding spindle during each cutting stroke and away from said axis of said workholding spindle during each return stroke such that the path of travel of a cutting edge of the cutting tool is different during cutting and return strokes thereby effecting cutting tool relieving, first cutting capsule traversing means independent of said desmodromic cam means for traversing said cutting capsule towards said axis of said workholding spindle to effect cutting tool infeed to some predetermined depth within the bore of the component and thereafter traversing said cutting capsule away from said axis of said workholding spindle after the machining of each slot.

An embodiment of the present invention provides a machine for machining a plurality of parallel longitudinally extending slots in the bore of a component, comprising an indexable work holding spindle housing a work holding collet for gripping said component, a cutting tool mounted on a cutting spindle, said cutting spindle pivotally supported for limited angular reciprocation in a spindle carrier, the rotational axis of said cutting spindle and the rotational axis of said work holding spindle being perpendicular and mutually offset, characterised in that said spindle carrier is in turn pivotally supported on a rotational axis for limited angular oscillation within a cutting capsule, said rotational axes of said cutting spindle and said spindle carrier being parallel and mutually offset, a shaft member arranged for continuous rotation journalled in said cutting capsule with a rotational axis parallel and mutually offset with respect to said rotational axis of said spindle carrier, means connecting said shaft member and said cutting spindle to cause angular reciprocation of said cutting spindle upon rotation of said shaft member, said shaft member having mounted thereon a cam means having two tracks each engaging a follower, each said follower having a rotational axis also parallel to said axis of rotation of said spindle carrier, each said follower mounted on an extension protruding laterally from said spindle carrier, said tracks of said cam means and said followers co-acting to angularly oscillate said spindle carrier through a limited angle in a substantially slack free manner upon rotation of said shaft member, whereby said axis of said cutting spindle is moved towards said axis of said work holding spindle during each cutting stroke and away from said axis of said work holding spindle during each return stroke, thereby generating a different path of the cutting tool during cutting and return strokes and effecting cutting tool relieving, means separate to said cam means for traversing said cutting capsule towards said axis of said work holding spindle thereby affecting cutting tool infeed and hence a series of progressively deeper cutting strokes during the cutting of each said slot in said component.

It is preferred that the connecting means comprises a crank mounted on the shaft member on which is journalled a connecting rod, the connecting rod being journalled at its other end to a lever extending from the cutting spindle. This ensures the necessary synchronisation between the cutting spindle and the spindle carrier. Of course the cutting spindle and the shaft member supporting the desmodromic cam mechanism could be actuated completely separately and the correct phase relationship controlled electronically.

It is also preferred that the desmodromic cam mechanism makes one revolution for each reciprocation of the cutting tool, that is one cutting stroke followed by one return stroke. This maintains a single rise and fall time history on each of the two cam tracks involved and hence, for a given mean diameter of cam, minimises the ramp angle of these tracks and hence allows the use of a practical diameter for the respective cam followers.

The inventors recognise that the desmodromic cam mechanism can be designed to modify the trajectory of the cutting tool during the cutting stroke as well as the return stroke, thereby enabling the machining of other than circular arcuate slots. This enables the machining of slots having radii greater or less than the nominal cutting radius of the toolholder, such radius being measured from the tip of the cutting tool in a direction perpendicular to the axis of reciprocation of the cutting spindle.

The inventors also recognise that it is not always necessary that the cutting tool return stroke be completely inside the circumference of the sleeve bore. In some applications, in order to achieve both adequate slot depth and adequate clearance of the toolholder in the bore of sleeves, some reduction in cutting tool life and slot edge quality near the ends of slots may be tolerable, particularly where the length of slot edge unaffected by the limited relieving of the cutting tool during the return stroke exceeds the length of the adjacent metering edge on the-mating valve input shaft.

Another preferred form of the present invention relates to such slotting machines which are required to slot the earlier referred to recent design sleeves of the type disclosed in Australian Provisional Patent Application PK3630. In such sleeves some slots extend to at least one axial extremity of the sleeve bore. In practice this requires these slots to be axially displaced with respect to the remaining fully-closed-ended slots and also to be cut comparatively deeper. This can be achieved in the present invention by journalling the work holding spindle for both sliding and rotation. By varying the axial position of the work holding spindle between two predetermined positions and varying the maximum infeed depth of the cutting capsule between two predetermined depths, and by mechanically synchronising these two motions with the rotational index position of the work holding spindle, a sleeve incorporating slots of the type described can be manufactured. It is preferred that the work holding spindle be supported in a highly accurate plain journal bearing or hydrostatic journal bearing, thereby enabling both sliding and rotation of this machine element. It is also possible to employ linear ball bearing races of the type well known in the field of machine tool design. Both these support methods are made possible by the fact that the work holding spindle is only required to slide through a small distance, and permit the work holding spindle to be extremely compact and laterally stiff. It should be noted that this style of work holding spindle support is quite distinct from the "sliding spindle carrier" arrangement disclosed in Australian Provisional Patent Application PK3520 which is designed to travel through a relatively large distance. Of course it would be theoretically possible to machine the axially displaced slots in sequential operations using two separate prior art slotting machines. However the extremely small angular tolerance between the two arrays of slots on such sleeves precludes any form of practical relocation of the component between slotting operations.

The axial slideability of the work holding spindle also permits that, after braking and stopping the cutting spindle near "top dead centre" of its reciprocation at completion of slotting, the work holding spindle can be lowered such that the cutting tool is now clear of the sleeve bore both radially and axially. This permits the cutting capsule, and hence the cutting tool, to laterally outfeed away from the sleeve and enables the sleeve component to be removed. Alternatively this clearance permits other operations to be carried out either before or after slotting, such prior or subsequent operations being carried out with the sleeve located in the work holding collet in the same orientation as used during the associated slotting.

The present invention will now be described by way of example with reference to the accompanying drawings in which.

Figure 1:
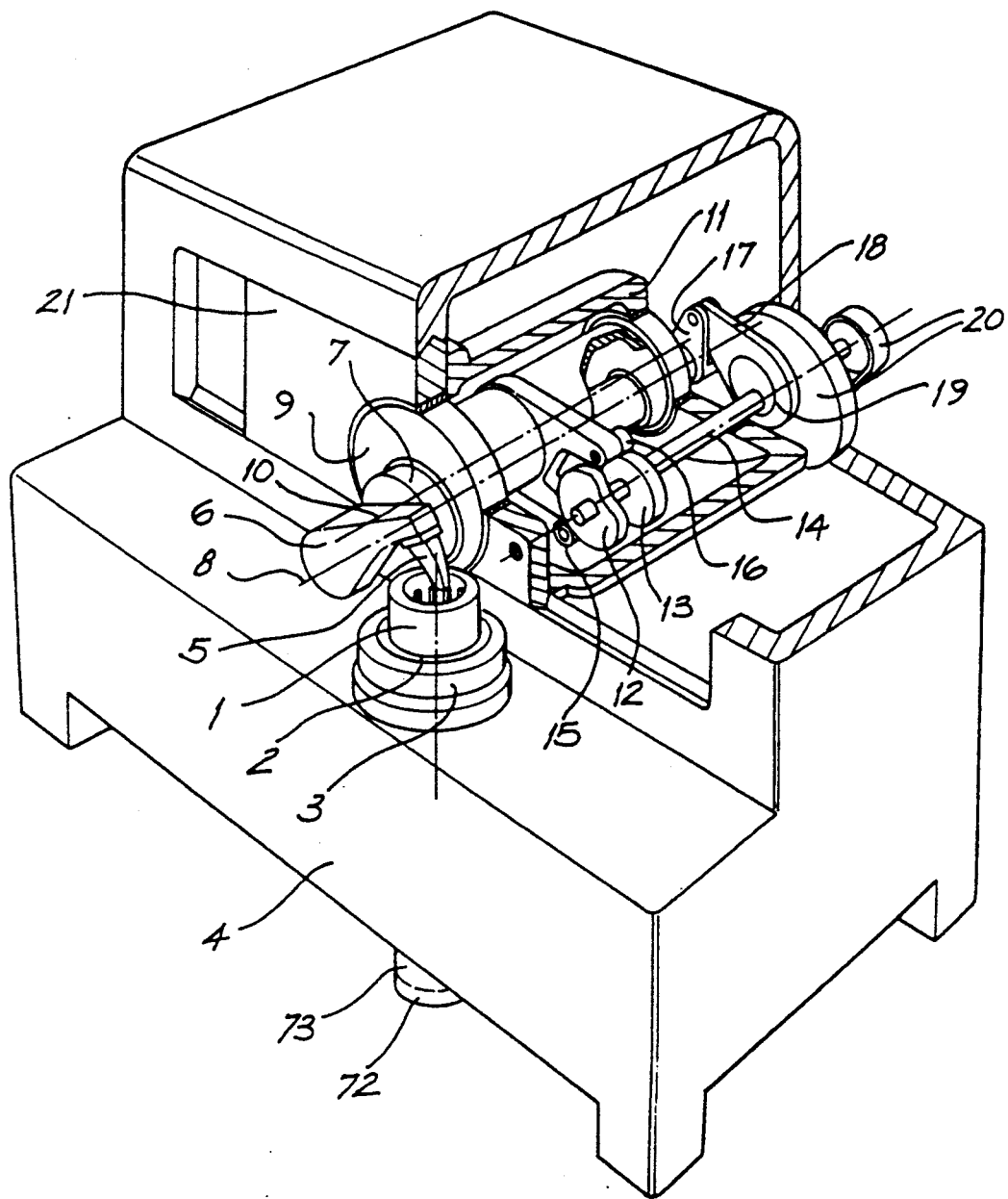
FIG. 1 is a sectioned perspective view of the slotting machine in accordance with the present invention.

FIG. 1 shows sleeve 1 held in collet 2 of work holding spindle 3 which is mounted for both rotation and axial sliding in machine base 4. Cutting tool 5 is secured to an arm 6 extending from cutting spindle 7. Cutting spindle 7 oscillates angularly through an angle of approximately 40 degrees and cutting tool 5 is shown in its uppermost position.

Figure 2:
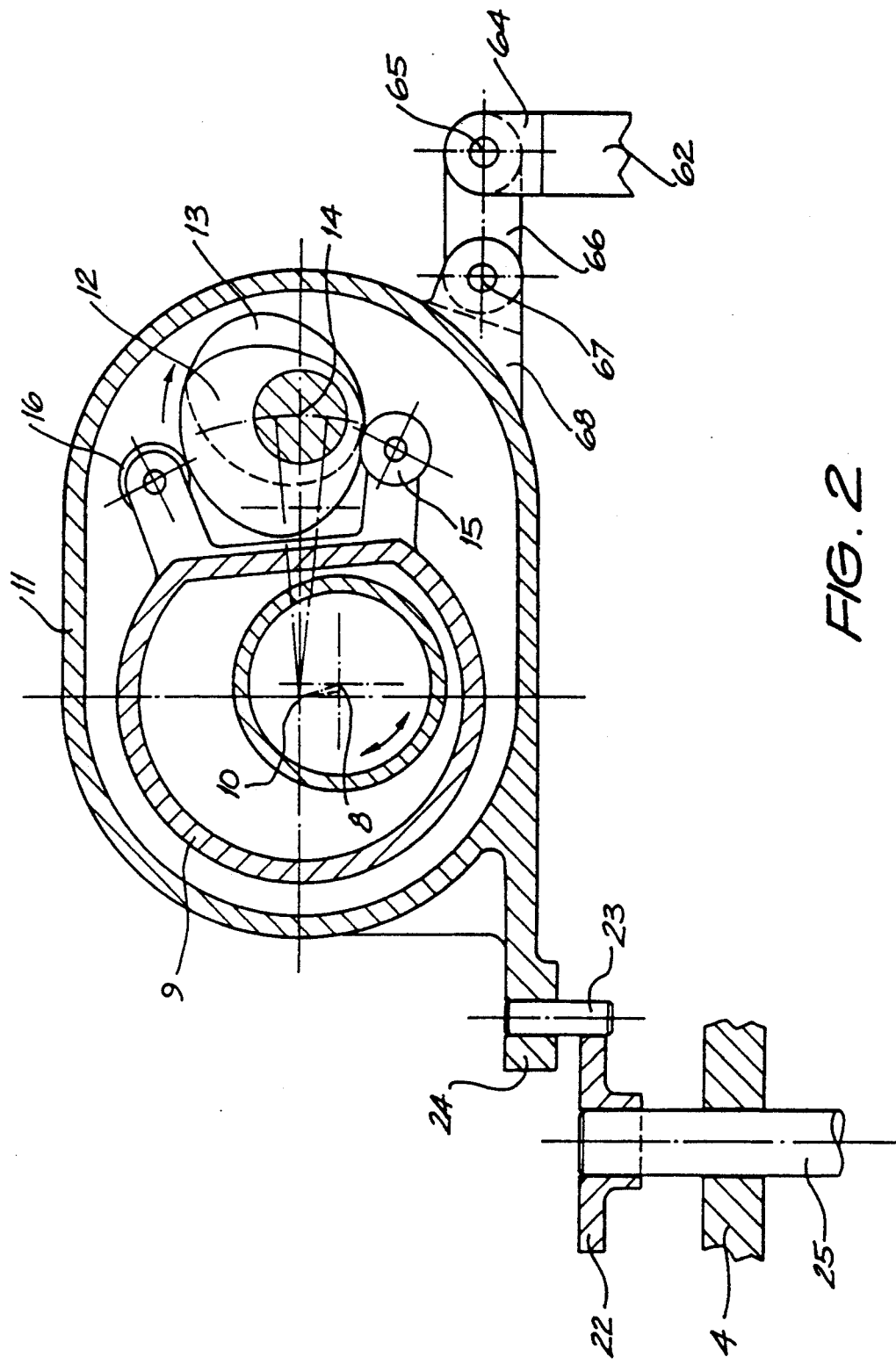
FIG. 2 is a partial sectional elevation view of the machine in FIG. 1 (section plane AA in FIG. 4), showing the desmodromic cam arrangement driving the spindle carrier.

Referring now also to FIG. 2, cutting spindle 7 is journalled for rotation about axis 8 within spindle carrier 9 which is itself journalled for angular oscillation about axis 10 in cutting capsule 11. The typical angular oscillation of spindle carrier 9 is approximately 8 degrees.

The angular oscillation of spindle carrier 9 is controlled by two adjacent cams 12 and 13 mounted on shaft 14 which is also journalled in cutting capsule 11. Cam 12 acts upon roller follower 15 and cam 13 acts upon roller follower 16 journalled on arms extending from spindle carrier 9. Cams 12 and 13 constitute a desmodromic arrangement, whereby angular oscillation of spindle carrier 9 occurs without any appreciable slack movement, and is shown in detail in FIG. 2.

Figure 3:
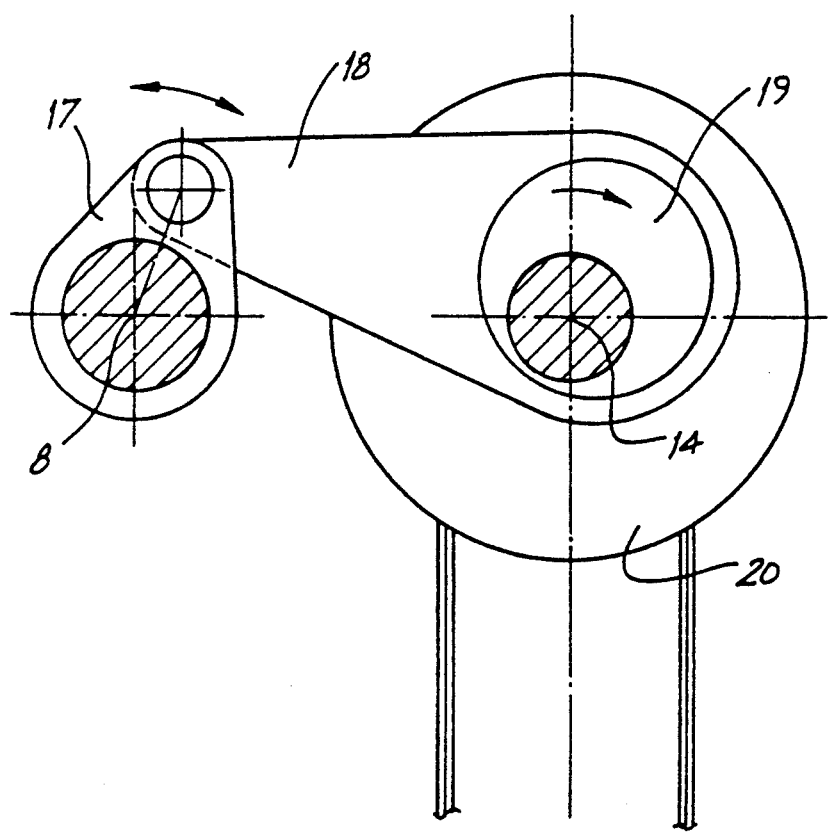
FIG. 3 is a partial sectional elevation view of the machine in FIG. 1 (section plane BB in FIG. 4), showing the connecting rod arrangement driving the cutting spindle.

The oscillation of cutting spindle 7 about axis 8 is controlled by lever 17 and connecting rod 18, the latter which is journalled on eccentric 19 mounted on shaft 14. This geometry is shown in detail in FIG. 3. The oscillation of cutting spindle 7 is thus the sum of the motions supplied by eccentric 19 to lever 17 and the oscillation of axis 8 caused by the motion imparted to axis 10 of spindle carrier 9 by desmodromic cams 12 and 13. Shaft 14 carries at its outer extremity fly-wheel and drive pulley arrangement 20.

Cutting capsule 11 is secured to slideway 21 which slides within precision guideways machined within machine base 4. During the operation of the machine, cutting tool 5 reciprocates in a series of alternate downward cutting strokes and return strokes whilst the entire mechanism comprising slideway 21, cutting capsule 11 and all the related mechanism slides progressively to the right (as shown in FIG. 1) so cutting an arcuate slot in sleeve 1. Thereafter slideway 21 retracts to the left an amount slightly in excess of the depth of the arcuate slot, and work holding spindle 3 indexes to a new position. The above cycle is repeated until all the required number of slots have been machined (typically six or eight slots).

Figure 4:
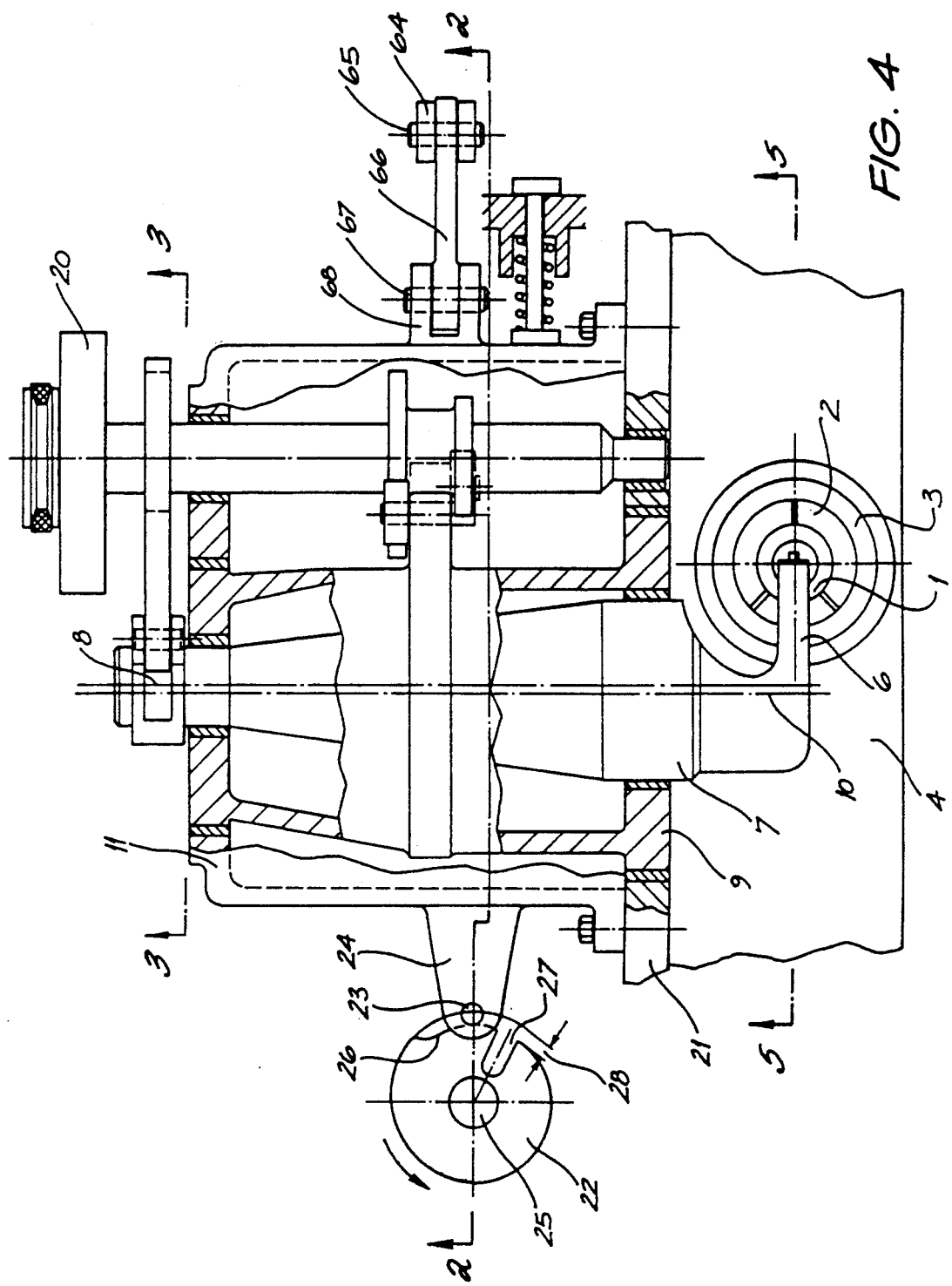
FIG. 4 is a partial sectional plan of the machine in FIG. 1, in the plane containing the axis of the cutting spindle.

Now referring to FIGS. 2 and 4, the progressive movement of slideway 21 and cutting capsule 11 to the right during cutting of the slots is controlled by feed cam 22 mounted on shaft 25 journalled in machine base 4 which reacts upon follower 23 which is secured to arm 24 extending from cutting capsule 11. Feed cam 22 rotates in the direction indicated in FIG. 4 and has, over approximately three quarters of its periphery, a scroll surface extending clockwise between, at one end, a radial slot 27 having a width suitable to accommodate follower 23 and, at the other end, a recessed cylindrical surface 26. The lift of the scroll surface of feed cam 22 has a radial displacement indicated as 28 which is sufficient to move slideway 21 and cutting spindle 7 to the right a distance slightly in excess of the depth of the arcuate slots in sleeve 1, typically about 3 mm.

Figure 5:
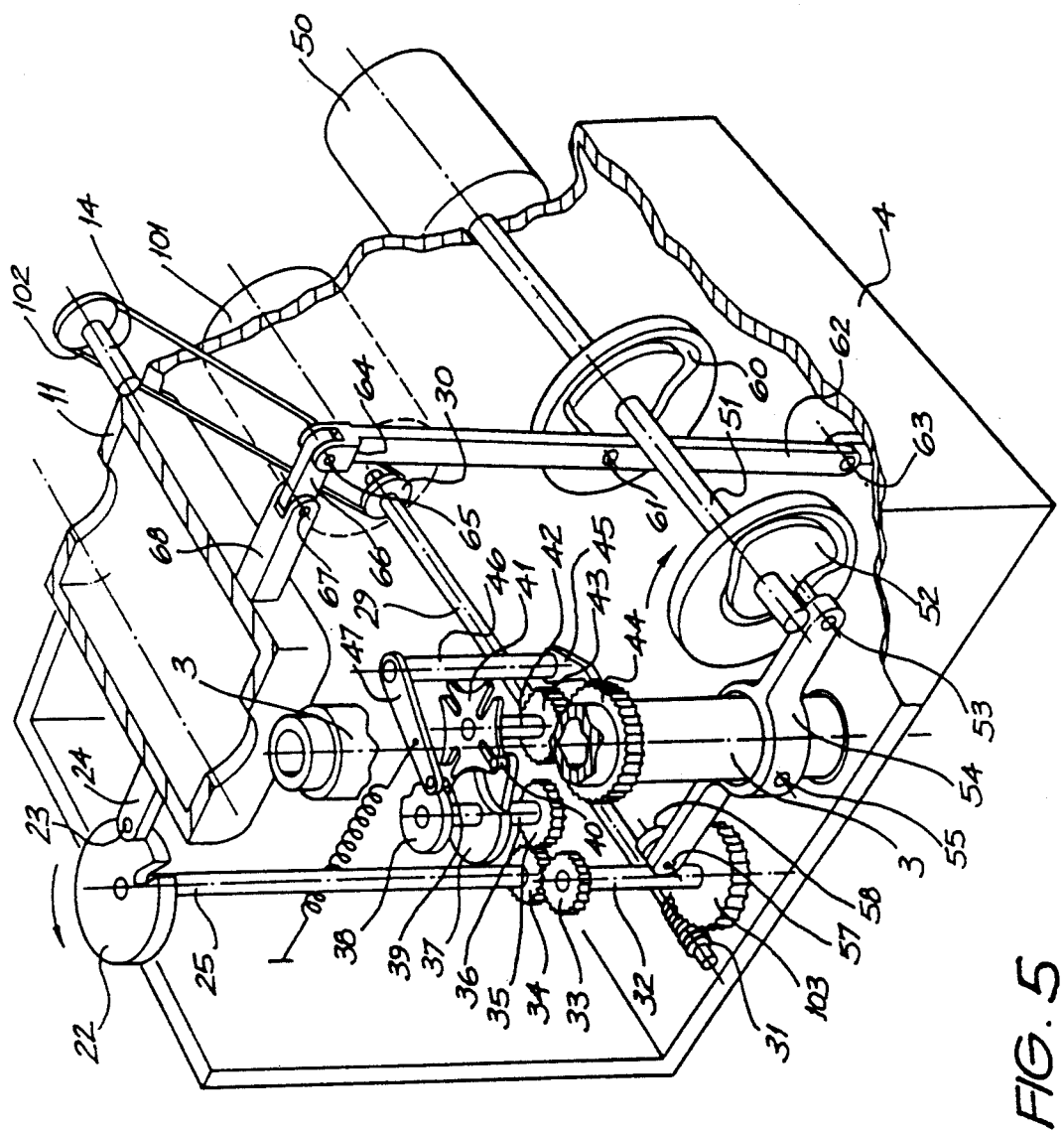
FIG. 5 is a sectioned perspective view of the lower portion of the machine in FIG. 1, showing the mechanism which coordinates the motion of the work holding spindle and the cutting capsule.

Now referring to FIG. 5, the mechanism coordinating the motions of the work holding spindle 3 and cutting capsule 11 is shown. For reasons of clarity the upper portion of the machine above cutting spindle 7 has been removed. Also work holding spindle 3 has been partly removed in order to expose the index and other mechanisms.

On the rear side of the machine base 4 is mounted main drive motor 101 connected by a coupling to drive shaft 29 which carries at its rear end pulley 30 which drives shaft 14 via belt 102. Drive shaft 29 carries at its front end worm 31 which drives worm wheel 103 mounted on shaft 32.

Journals for these shafts, as for all other shafts in the mechanism to be described, are omitted for the sake of clarity. Shaft 32 carries at its upper end gear 33 which meshes with gear 34 carried on the lower end of shaft 25.

The belt drive ratio between drive shaft 29 and shaft 14 is generally about 1:1 so that, for every revolution of main drive motor 101, jutting spindle 7 reciprocates through one complete downward cutting stroke and following return stroke. Typically about 30 such strokes are required to machine each sleeve slot. Furthermore the gearing ratio between worm 31 and worm wheel 103 is about 40:1 so that only three quarters of a revolution of cam 22 (that is the scroll surface earlier referred to) is required to transmit to follower 23, and hence cutting capsule 11, the full cutting travel needed to machine one slot. Gear 34 drives gear 35 mounted on shaft 36 which carries Geneva drive plate 37 and, still further up the shaft, disc cam 38 engaging pin follower 39. Geneva drive plate 37 has an arm extending therefrom which carries Geneva drive pin 40 which successively engages the four slots of Geneva wheel 41 in the conventional manner. Geneva wheel 41 is mounted on shaft 42 which carries at its lower end gear 43 which meshes with master index gear 44 mounted on work holding spindle 3. Note that master index gear 44 serves the dual purpose of providing for the rotation of the work holding spindle, and also for its precision indexing through the engagement of pawl 45 with the teeth of master index gear 44. This pawl is mounted on shaft 46 having, at its upper end, lever 47 with follower pin 39 at its extremity. A spring urges pawl 45 into engagement in an appropriate tooth of master index gear 44 at all times other than when it is lifted momentarily through the action of the rotation of disc cam 38 and follower pin 39.

The ratio between gear 43 and master index gear 44 is typically 1:2, so that, in the instance shown, if gears 33, 34 and 35 are all of the same diameter, a slot will be machined in sleeve 1 every one eighth of a revolution of work holding spindle 3 so machining an eight slot sleeve. The ratio between gear 43 and master index gear 44 would be 2:3 in the case of a six slot sleeve.

At the instant illustrated in FIG. 4 and in FIG. 5, feed cam 22 has rotated through most of the recessed cylindrical surface 26 during which time slideway 21 has moved to the left to clear cutting tool 5 from the sleeve bore and Geneva mechanism 37–41 has driven the work holding spindle 3 to the next slot position. This retract movement of the slideway 21 is effected by a spring which urges slideway 21 to the left only as far as the position indicated in FIG. 4.

In the case of the last slot of an eight slot sleeve, a counting mechanism (not shown) will stop main drive motor 101 abruptly in such a position that radial slot 27 of feed cam 22 extends radially towards follower 23.

Figure 6:
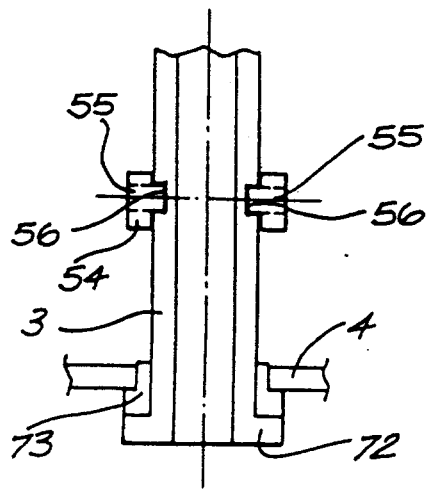
FIG. 6 is a sectional elevation view of the work holding spindle on plane CC in FIG. 4.

At the same instant loader drive motor 50, which incorporates a reduction mechanism, is energised to rotate shaft 51 in the direction shown. Shaft 51 is journalled in machine base 4 and carries, at its remote end from loader drive motor 50, cam 52 which serves to lower and then raise work holding spindle 3 in the manner that will now be described. The track of cam 52 engages follower 53 secured to yoke 54 which loosely surrounds work holding spindle 3 in the manner illustrated in detail FIG. 6. Here it will be seen that pins 55, one on either side, extend radially inwardly to engage groove 56 cut in work holding spindle 3 thus coupling the rise and fall of yoke 54 to work holding spindle 3 while allowing free rotation thereof. Yoke 54 extends beyond work holding spindle 3 and is provided with pivot 57 secured to bracket 58 integral with machine base 4. By this means, the rise and fall of follower 53 is transferred to work holding spindle 3. It will be seen that, in the position of cam 52 illustrated, follower 53 is in its uppermost position but upon further rotation of cam 52 it is driven downwardly hence lowering work holding spindle 3 so that sleeve 1 is now clear of the lower end of cutting tool 5. Such lowering of work holding spindle 3 may occupy approximately 60 degrees rotation of cam 52, whereupon it is required that slideway 21 moves to the left carrying with it cutting spindle 7 and cutting tool 5 so allowing the removal of sleeve 1 from collet 2. This movement is accomplished through the action of cam 60 which, in the position illustrated in FIG. 5, is shown engaging follower 61 at a position on its track of smallest radius which extends around this cam for about 60 degrees. Follower 61 is secured to retract lever 62 which is pivoted to machine base 4 at bracket 63 and extends upwardly in the form of fork 64. Here pin 65 engages link 66 which is itself secured by pin 67 to yoke 68 extending from cutting capsule 11. Thus upon continued rotation of cam 60 cutting capsule 11 is driven to the left as in FIG. 4 and causes follower 23, secured to arm 24 of cutting capsule 11, to enter radial slot 27 of feed cam 22. In this position of slideway 21, cutting tool 5 has been moved a sufficient distance to clear the outside diameter of sleeve 1 and hence allow its removal from collet 2 by a collet operating mechanism of a conventional type actuated by the rotation of shaft 51 (not shown). Loader drive motor 50 is arrested while the loading of the next sleeve 1 is performed by the operator, whereupon loader drive motor 50 is restarted to again move slideway 21 to the right under the action of the cam track of cam 60 so restoring the slideway to its position ready to commence the first cut of the sleeve and thereafter raising work holding spindle 3 to its original height through the action of cam 52 in a reverse of the order of events described earlier. It is important that work holding spindle 3 is accurately and rigidly supported in its uppermost position and to this end it is provided with a flange 72 which bears on flanged bearing 73 secured in machine base 4 (refer to FIG. 6). Pins 55 exert considerable upward force on work holding spindle 3 during cutting in order to assure rigid support thereof. The machine is now ready to commence the machining of the next component.

Figure 8:
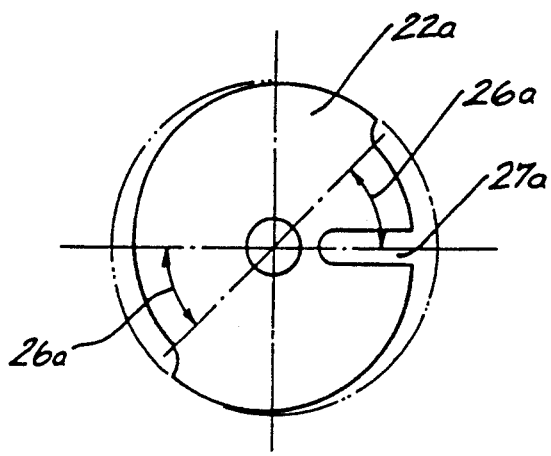
FIG. 8 shows details of the feed cam of the machine in FIG. 7.
Figure 7:
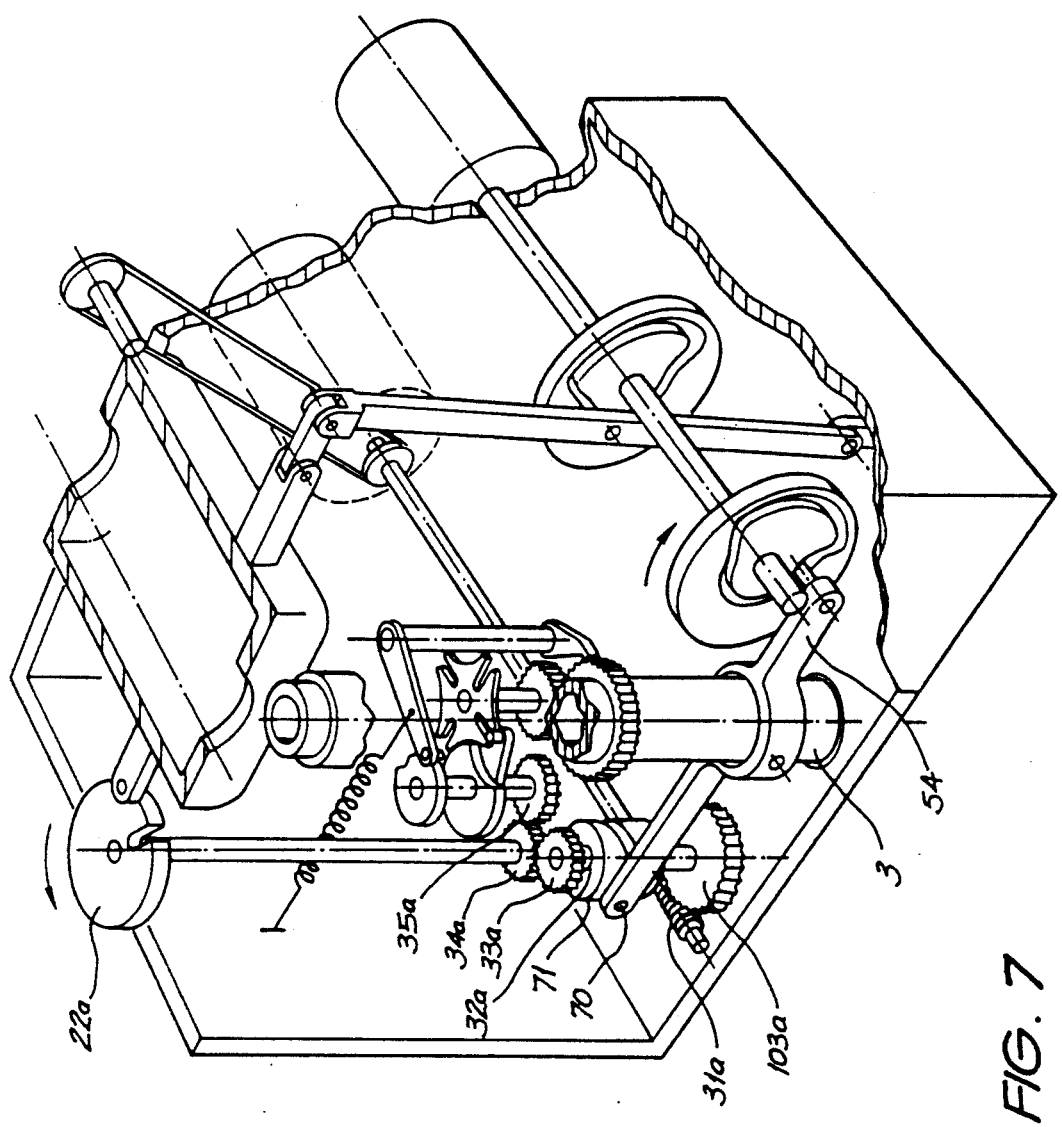
FIG. 7 is one preferred form of the machine in accordance with the present invention.

Referring now to a preferred form of the invention, a slotting machine will now be described which produces a sleeve having some slots extending to at least one axial extremity of the sleeve bore. For the purposes of this description the sleeve will be assumed to have each alternate (i.e. each second) slot axially displaced and of differing depth. In FIG. 7 it will be seen that much of the mechanism illustrated in FIG. 5 remains substantially unchanged. It will be recollected that, in the description relating to FIG. 5, the loading part of the cycle of operation of the machine finishes with yoke 54 and work holding spindle 3 in the raised position such that cutting tool 5 now has entered the bore of sleeve 1. In order to machine every second slot in sleeve 1 further down the bore, it is necessary to raise work holding spindle 3 for machining such deeper slots and then lower work holding spindle 3 for machining the following slot. This is accomplished according to the mechanism illustrated in FIG. 7 by extending yoke 54 to the left so that, instead of being hinged about a fixed point as provided by pivot 57, it is extended so that new fulcrum 70 is provided comprising a follower which enters a slot in drum cam 71 secured to shaft 32a which corresponds to shaft 32 of the machine illustrated in FIG. 5. In this machine a worm 31a and wormwheel 103a have a ratio of 1:80 rather than 1:40 as in the case of worm 31 and wormwheel 103. It follows that feed cam 22a makes one revolution for every two slots as compared to every slot in the case of feed cam 22 of the machine shown in FIG. 5. Features of this cam are shown in FIG. 8. There are now two recessed cylindrical portions on the periphery of this cam indicated by constant radius portions 26a followed by two opposing scroll surfaces. These scroll surfaces on feed cam 22a may be of a different lift, so that the alternate axially displaced slots may be of different depth. Only one radial slot 27a is provided. Note that the ratio of gears 33a and 34a remain 1:1 as previously, whereas the ratio of gear 34a to gear 35a is now made 2:1. It follows that because the reduction provided by worm 31a and worm wheel 103a is double that previously, and this is matched by the changed ratio between gears 34a and 35a, the entire Geneva index mechanism operates precisely as in the case of the machine shown in FIG. 5. All other aspects of the two machines are substantially identical except for this specific construction at the lower end of work holding spindle 3.

Figure 9:
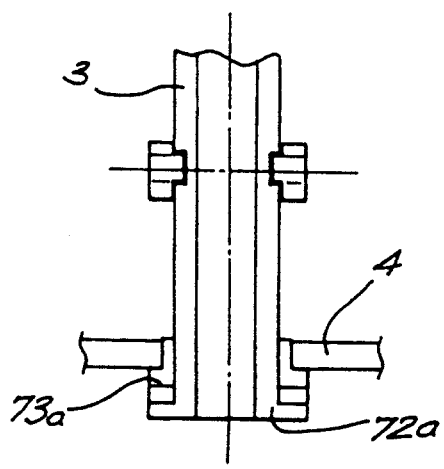
FIG. 9 is a sectional elevation view of the work holding spindle of the machine in FIG. 7.
Figure 10:
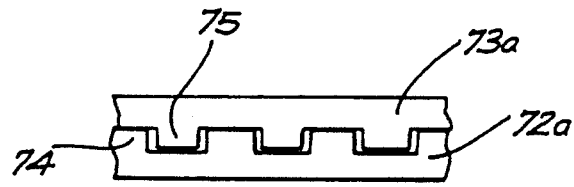
FIG. 10 shows the position of the series of castellations in FIG. 9 when the work holding spindle is stopped in its upward position.
Figure 11:
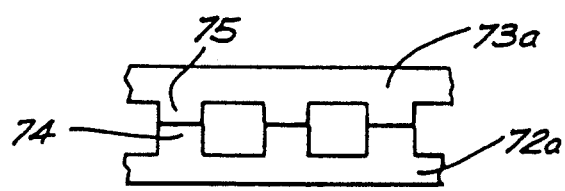
FIG. 11 shows the position of the series of castellations in FIG. 9 when the work holding spindle is stopped in its downward position.

Referring now to FIGS. 9, 10 and 11 which show the upward stopping arrangement used in the preferred form of the machine. It will be seen that work holding spindle 3 is enlarged as a flange 72a which now incorporates a series of castellations 74 which engage, with circumferential clearance, slots formed between corresponding castellations 75 incorporated in flanged bearing 73a.

The number of castellations on each part will generally be the same and may be four in the case of eight slot sleeves and three in the case of six slot sleeves.

Now, as drum cam 71 serves to raise and lower fulcrum 70, and hence work holding spindle 3 to alternate heights appropriate to the alternating axial position of slots in sleeves machined in the preferred form of the machine, the castellations alternately engage in a manner shown in FIG. 10 and in the manner shown in FIG. 11, so providing rigid support and accurate upward height location of work holding spindle 3 during the machining of all slots.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A machine for machining a plurality of parallel longitudinally extending slots in a bore of a component, comprising an indexable workholding spindle housing a workholding device for gripping said component, a cutting tool mounted on a cutting spindle, said cutting spindle being pivotally supported for angular reciprocation in a spindle carrier, the rotational axis of said cutting spindle being substantially perpendicular to and mutually offset from the rotational axis of said workholding spindle, characterised in that said spindle carrier is in turn pivotally supported on a rotational axis for angular oscillation within a cutting capsule, said rotational axis of said cutting spindle being parallel to and offset relative to the rotational axis of said spindle carrier, connecting means connecting a rotatable shaft member and said cutting spindle to effect angular reciprocation of said cutting spindle upon rotation of said shaft member, desmodromic cam means controlling angular oscillation of said spindle carrier upon rotation of said shaft member, wherein said axis of said cutting spindle is movable towards said axis of said workholding spindle during each cutting stroke and away from said axis of said workholding spindle during each return stroke such that the path of travel of a cutting edge of the cutting tool is different during cutting and return strokes thereby effecting cutting tool relieving, first cutting capsule traversing means independent of said desmodromic cam means for traversing said cutting capsule towards said axis of said workholding spindle to effect cutting tool infeed to some predetermined depth within the bore of the component and thereafter traversing said cutting capsule away from said axis of said workholding spindle after the machining of each slot.

2. A machine for machining a plurality of parallel longitudinally extending slots in a bore of a component, comprising an indexable workholding spindle housing a workholding device for gripping said component, a cutting tool mounted on a cutting spindle, said cutting spindle being pivotally supported for angular reciprocation in a spindle carrier, the rotational axis of said cutting spindle being substantially perpendicular to and mutually offset from the rotational axis of said workholding spindle, characterised in that said spindle carrier is in turn pivotally supported on a rotational axis for angular oscillation within a cutting capsule, said rotational axis of said cutting spindle being parallel to and offset relative to the rotational axis of said spindle carrier, connecting means connecting a rotatable shaft member and said cutting spindle to effect angular reciprocation of said cutting spindle upon rotation of said shaft member, desmodromic cam means controlling angular oscillation of said spindle carrier upon rotation of said shaft member, wherein said axis of said cutting spindle is movable towards said axis of said workholding spindle during each cutting stroke and away from said axis of said workholding spindle during each return stroke such that the path of travel of a cutting edge of the cutting tool is different during cutting and return strokes thereby effecting cutting tool relieving, first cutting capsule traversing means independent of said desmodromic cam means for traversing said cutting capsule towards said axis of said workholding spindle to effect cutting tool infeed to some predetermined depth within the bore of the component and thereafter traversing said cutting capsule away from said axis of said workholding spindle after the machining of each slot; wherein said cutting spindle has limited angular reciprocation; the spindle carrier has limited angular oscillation; and further wherein the shaft member is mounted in the cutting capsule such that the rotational axis of the shaft member is parallel to and offset relative to the rotational axis of the spindle carrier; the desmodromic cam means is mounted on said shaft member and comprises two tracks each engaging a follower, each follower having a rotational axis parallel to the axis of rotation of the spindle carrier, each follower being mounted in an extension protruding laterally from the spindle carrier, the tracks of the cam means and the followers co-acting to angularly oscillate the spindle carrier through a predetermined angle upon rotation of the shaft member.

3. A machine as claimed in claim 1 wherein said connecting means comprises a crank.

4. A machine as claimed in claim 1 wherein one revolution of said desmodromic cam means corresponds to each cutting stroke and its associated return stroke.

5. A machine as claimed in claim 1 wherein the path of travel of the cutting edge of the cutting tool during each cutting stroke is non-circular.

6. A machine as claimed in claim 1 wherein the path of travel of the cutting edge of said cutting tool during each return stroke is at least partially within the circumference of the bore of the component.

7. A machine as claimed in claim 1 wherein the workholding spindle is journalled for rotational motion and also for axial sliding motion.

8. A machine as claimed in claim 7 wherein said axial sliding motion occurs between two predetermined positions, a first position where said slots are machined and a second position where the cutting tool is clear of the sleeve bore both axially and radially and including second cutting capsule traversing means whereby the cutting capsule is laterally movable away from the axis of the workholding spindle a sufficient distance to permit removal of the machined component.

9. A machine as claimed in claim 1 adapted to form slots of at least two different predetermined radial depths within the bore of the component in which said first cutting capsule traversing means arrests the traverse of the cutting capsule towards the axis of said workholding spindle in different positions for different slots.

10. A machine as claimed in claim 7 wherein said workholding spindle is journalled for axial sliding motion between a plurality of predetermined axial positions including two or more positions where said slots are machined thereby machining slots of two or more different axial positions within the bore of a component.

11. A machine as claimed in claim 7 wherein the workholding spindle is plain journalled.

12. A machine as claimed in claim 7 wherein the workholding spindle is hydrostatically journalled.

13. A machine as claimed in claim 7 wherein the workholding spindle is mounted on linear ball bearing races.

14. A machine as claimed in claim 2 wherein the workholding spindle is journalled for rotational motion and also for axial sliding motion.

15. A machine as claimed in claim 2 wherein said connecting means comprises a crank.

16. A machine as claimed in claim 2 wherein said revolution of said desmodromic cam means corresponds to each cutting stroke and its associated return stroke.

17. A machine as claimed in claim 2 wherein the path of travel of the cutting edge of the cutting tool during each cutting stroke is non-circular.

18. A machine as claimed in claim 2 wherein the path of travel of the cutting edge of said cutting tool during each return stroke is at least partially within the circumference of the bore of the component.

19. A machine as claimed in claim 14 wherein said axial sliding motion occurs between two predetermined positions, a first position where said slots are machined and a second position where the cutting tool is clear of the sleeve bore both axially and radially and including second cutting capsule traversing means whereby the cutting capsule is laterally movable away from the axis of the workholding spindle a sufficient distance to permit removal of the machined component.

20. A machine as claimed in claim 14, adapted to form slots of at least two different predetermined radial depths within the bore of the component in which said first cutting capsule traversing means arrests the traverse of the cutting capsule towards the axis of said workholding spindle in different positions for different slots.

21. A machine as claimed in claim 14 wherein said workholding spindle is journalled for axial sliding motion between a plurality of predetermined axial positions including two or more positions where said slots are machined thereby machining slots of two or more different axial positions within the bore of a component.

22. A machine as claimed in claim 14 wherein the workholding spindle is plain journalled.

23. A machine as claimed in claim 14 wherein the workholding spindle is hydrostatically journalled.

24. A machine as claimed in claim 14 wherein the workholding spindle is mounted on linear ball bearing races.

* * * * *